United States Patent [19]
Yang

[11] Patent Number: 5,685,179
[45] Date of Patent: Nov. 11, 1997

[54] PADLOCK HAVING A FREELY ROTATABLE SHACKLE

[76] Inventor: Yaw-Kuen Yang, No. 190-30, Chang Shoei Rd., Tsyh Torng Li, Chang Hua, Taiwan

[21] Appl. No.: 625,370

[22] Filed: Apr. 1, 1996

[51] Int. Cl.[6] .................................................. F05B 37/06
[52] U.S. Cl. ........................... 70/28; 24/600.7; 24/599.7; 70/53; 70/25; 70/22
[58] Field of Search ...................... 70/22, 25, 27, 70/28, 42, 51, 24, 53; 24/265 H, 599.7, 600.7

[56] References Cited

U.S. PATENT DOCUMENTS

| | | | |
|---|---|---|---|
| 688,006 | 12/1901 | Rickman | 24/559.7 |
| 715,655 | 12/1902 | Getz et al. | 24/599.7 |
| 1,224,168 | 5/1917 | Herman | 70/25 |
| 1,508,308 | 9/1924 | Thompson | 24/599.7 |
| 3,815,184 | 6/1974 | Hopp | 24/600.7 |
| 4,372,016 | 2/1983 | LaViolette et al. | 24/600.7 |
| 4,803,856 | 2/1989 | Ling | 70/28 |
| 4,805,426 | 2/1989 | Dimmick et al. | 70/22 |
| 4,860,561 | 8/1989 | Hwang | 70/28 |
| 5,042,277 | 8/1991 | Jenn-Rong | 70/28 |
| 5,359,867 | 11/1994 | Ling et al. | 70/28 |

FOREIGN PATENT DOCUMENTS

| | | | |
|---|---|---|---|
| 3940 | 6/1891 | Switzerland | 24/599.7 |
| 0014371 | 5/1894 | United Kingdom | 24/600.2 |

*Primary Examiner*—Darnell M. Boucher
*Attorney, Agent, or Firm*—Browdy and Neimark

[57] ABSTRACT

A padlock comprises a body and a shackle capable of rotating freely. The body is provided therein with a dial set having a plurality of the numbered wheels mounted on a shaft rod capable of an axial displacement. The shackle is provided with a neck fastened pivotally with the body. The neck is provided at the bottom thereof with a through hole extending along the axis of the neck and engageable with the shaft rod. The shackle is further provided with a hooked portion and a retaining member fastened pivotally thereto between the neck and the hooked portion. The hook portion is provided with a cut which is pressed against by one end of the retaining member. The top end of the shaft rod is pressed against by another end of the retaining member.

2 Claims, 4 Drawing Sheets

PADLOCK HAVING A FREELY ROTATABLE SHACKLE

FIELD OF THE INVENTION

The present invention relates generally to a padlock, and more particularly to a padlock having a shackle that can be rotated freely.

BACKGROUND OF THE INVENTION

As shown in FIG. 1, a prior art padlock 70 comprises a body 71, a plurality of the numbered wheels 72, and a shackle 73. The shackle 73 can be rotated only when the padlock 70 is in an unlocking state. In other words, the shackle 73 can not be rotated freely when the padlock 70 is in a locking state. In the process of unlocking the padlock 70 which is in a locking state, it is often necessary to turn over the padlock 70 for an angle of 180 degrees to facilitate the dialing of the numbered wheels 72. However, the motion of turning the padlock 70 is often obstructed by a locking member 74.

As shown in FIG. 2, a prior art combination lock 80 comprises a shackle 81 and a body 82. The shackle 81 can not be turned in relation to the body 82. As a result, the combination lock 80 can not be used handily.

SUMMARY OF THE INVENTION

It is therefore the primary objective of the present invention to provide a padlock with a shackle capable of rotating freely when the padlock remains in a locking state and in an unlocking state.

It is another objective of the present invention to provide a padlock with a body capable of rotating freely when the shackle of the padlock is fastened with an object.

The foregoing objectives of the present invention are attained by a padlock, which comprises a body, and a shackle. The body is provided therein with a dial set having a plurality of the numbered wheels. The dial set is provided axially with a shaft rod capable of an axial displacement. The shackle is provided with a neck fastened pivotally with the body. The neck is provided axially at the bottom thereof with a through hole engageable with the shaft rod. The shackle is provided with a hooked portion and a retaining member fastened pivotally thereto between the neck and the hooked portion. The hooked portion is provided with a cut which is pressed against by one end of the retaining member. In the meantime, the top end of the shaft rod is pressed against by another end of the retaining member. The shackle can be rotated freely in relation to the body in view of the fact that the neck of the shackle is fastened pivotally with the body of the padlock.

The foregoing objectives, features, functions and advantages of the present invention will be more readily understood upon a thoughtful deliberation of the following detailed description of the present invention in conjunction with the accompanying drawings.

DETAILED DESCRIPTION OF THE INVENTION

Figure 2:
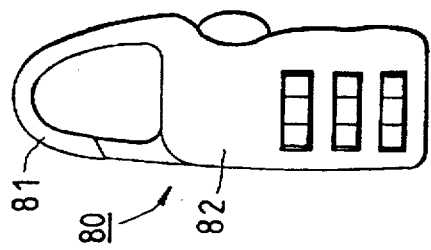
FIG. 2 shows a plan schematic view of another prior art padlock.
Figure 1:
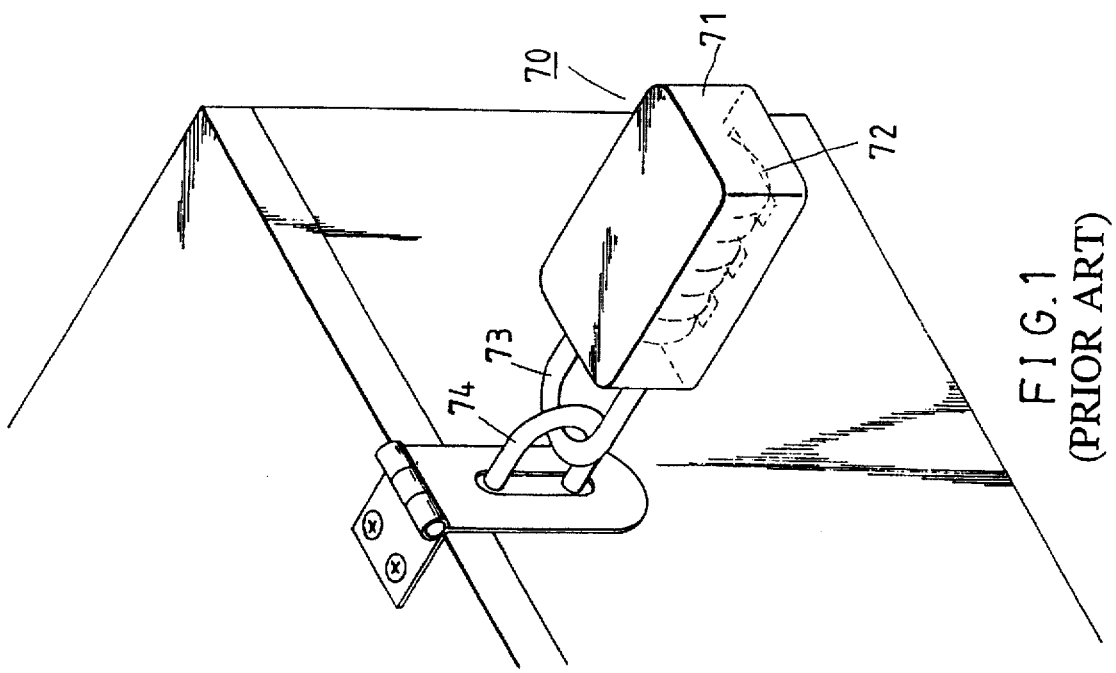
FIG. 1 shows a perspective schematic view of a prior art padlock.
Figure 3:
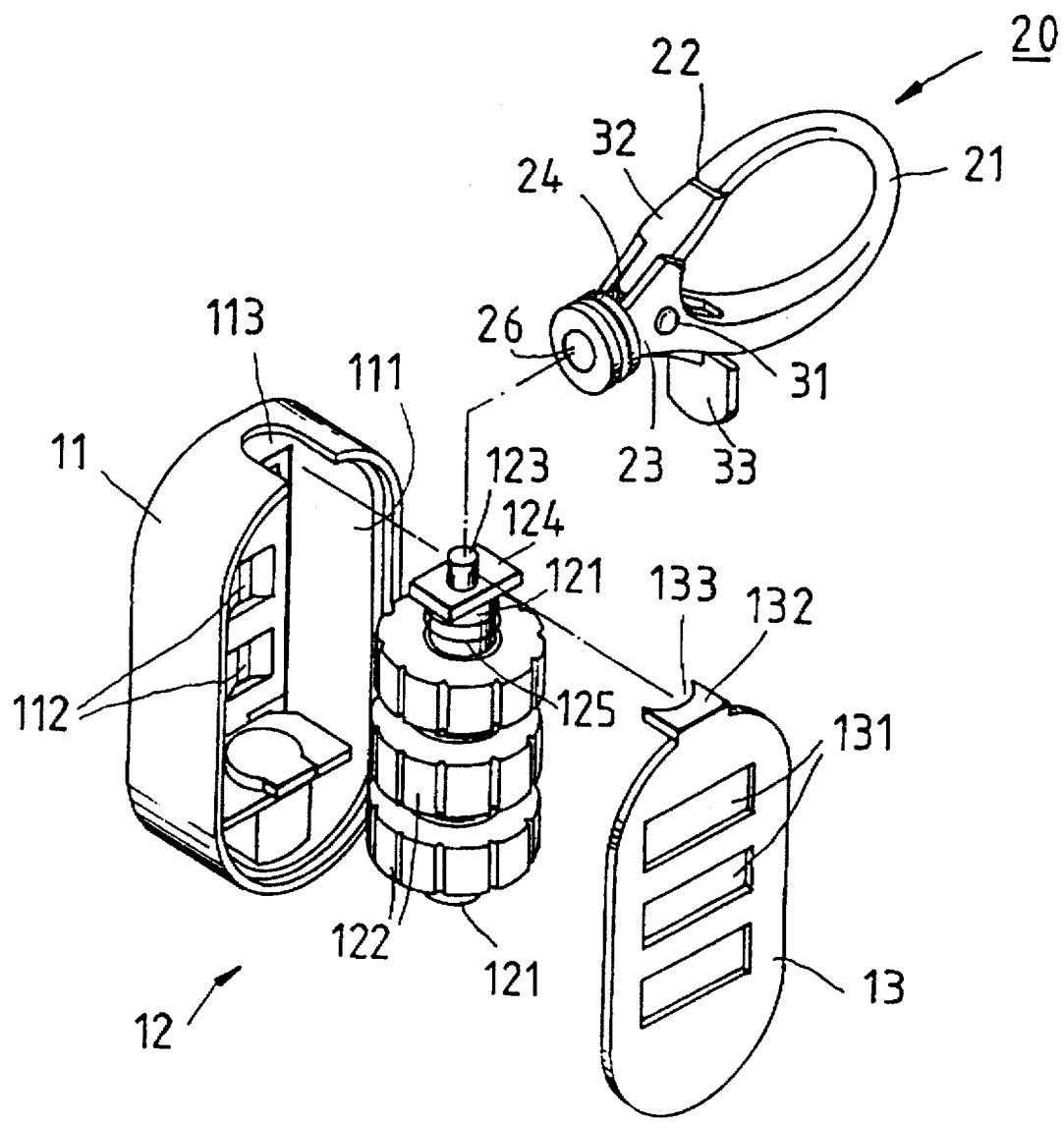
FIG. 3 shows an exploded view of a first preferred embodiment of the present invention.
Figure 4:
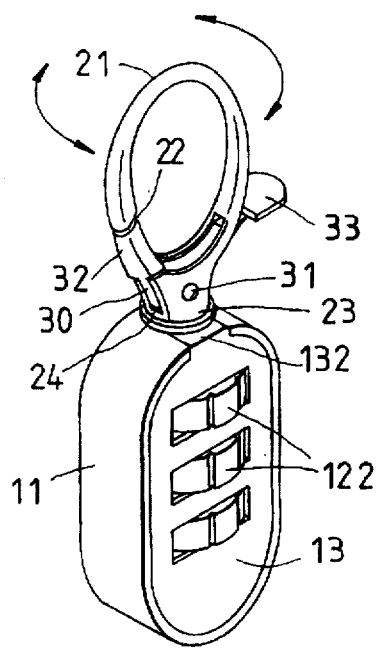
FIG. 4 shows a schematic view of the first preferred embodiment of the present invention in combination.

As shown in FIGS. 3 and 4, a padlock embodied in the present invention is composed of a body 10 and a shackle 20.

The body 10 is a combination lock and is composed of a housing 11 of an oblong construction. The housing 11 is provided therein with a receiving space 111 which is in turn provided horizontally at the bottom thereof with three through holes 112. The receiving space 111 is further provided at the top thereof with a pivoting slot 113 of a U-shaped construction. A numbered wheel set 12 is housed in the receiving space 111 and is composed of a shaft rod 121 and three numbered wheels 122. The shaft rod 121 is provided at the top end thereof with a round projection 123 having thereunder a locating surface 124. The bottom of the locating surface 124 is provided with a spring 125. The numbered wheels 122 are mounted on the shaft rod 121 such that the numbered wheels 122 can actuate the axial displacement of the shaft rod 121. A cover 13 is provided at the center thereof with three through holes 131 and at the top side thereof with an extension block 132 having at the front edge thereof a recess 133. The combination of the housing 11 and the numbered wheel set 12 and the function of the numbered wheel set 12 are similar to the prior art and will not be therefore expounded further.

The shackle 20 has a hooked portion 21 provided with a cut 22, and a neck 23 provided at the bottom thereof with a ring slot 231. The shackle 20 further has a receiving slot 24 located between the neck 23 and the cut 22. The neck 23 is provided axially with a through hole 26 in communication with the receiving slot 24, in which a retaining member 30 is received such that the retaining member 30 is fastened pivotally with the shackle 20 by means of a pivoting pin 31. The retaining member 30 has an urging end 32 which is received in the cut 22 of the shackle 20 so as to seal off the hooked portion 21 of the shackle 20. The retaining member 30 further has a triggering portion 33 opposite in location to the urging end 32. The triggering portion 33 is provided with a braking portion 34, as shown in FIGS. 5 and 6.

In combination, the through hole 26 of the shackle 20 is engaged with the projection 123 of the shaft rod 121 before the numbered wheel set 12 is housed in the receiving space 111 of the housing 11. As a result, the ring slot 231 of the neck 23 of the shackle is engaged with the pivoting slot 113. The cover 13 is joined with the open end of the receiving space 111.

Figure 5:
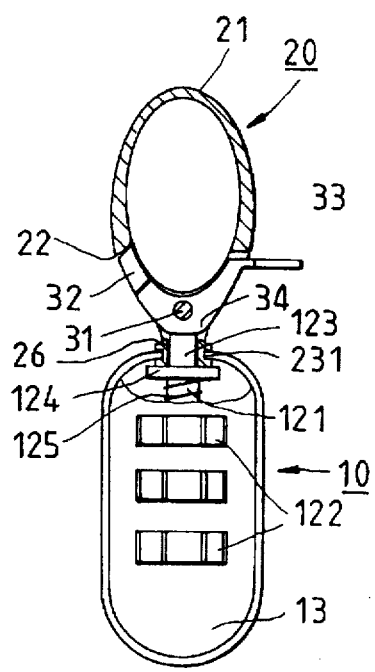
FIG. 5 shows a partial sectional view of the first preferred embodiment as shown in FIG. 4.

As illustrated in FIG. 5, the padlock of the present invention remains in a locking state such that the shaft rod 121 is prevented by the numbered wheels 122 from moving axially. In other words, when the triggering portion 33 of the retaining member 30 is exerted on by a force, the braking portion 34 of the retaining member 30 does not move the shaft rod 121 downwards. As a result, the urging end 32 of the retaining member 30 is retained in the cut 22 of the shackle 20.

Figure 6:
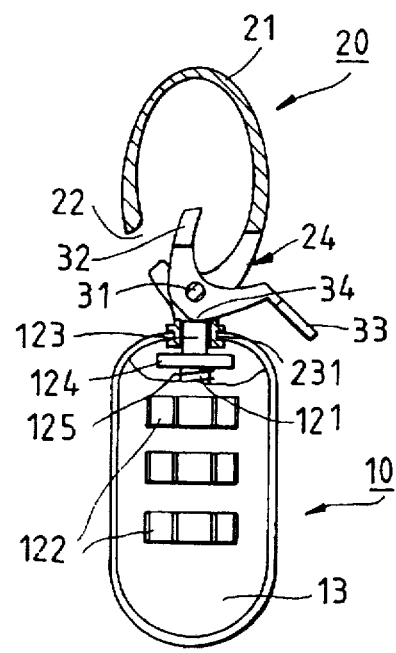
FIG. 6 shows a schematic view of the first preferred embodiment in action according to the present invention.

As illustrated in FIG. 6, when the number wheels 122 are arranged in a correct combination to unlock the padlock, the shaft rod 121 is relieved of the braking effect of the numbered wheels 122. When the triggering portion 33 of the retaining member 30 is pressed, braking portion 34 is caused to swivel on the pivoting pin 31 acting as a fulcrum such that the projection 123 of the shaft rod 121 is pressed against by the braking portion 34. As the shaft rod 121 is forced to move downwards, the retaining member 30 is actuated to turn a predetermined angle so as to cause the urging end 32 of the retaining member 30 to move away from the cut 22 of the shackle 20. As a result, the padlock is in an unlocking state. When the triggering portion 33 is relieved of the force exerting thereon, the retaining member 30 is forced by the spring 125 of the numbered wheel set 12 to return to its original position.

The shackle 20 of the present invention is capable of a free movement around the axis of the shaft rod 121, as shown by an arrow in FIG. 4, in view of the fact that the neck 23 of the shackle 20 is fastened pivotally with the body 10 in such a manner that the ring slot 231 of the neck 23 is retained in the pivoting slot 113 of the housing 11. In addition, the neck 23 is engaged pivotally with the recess 133 of the extension block 132 of the cover 13.

Figure 7:
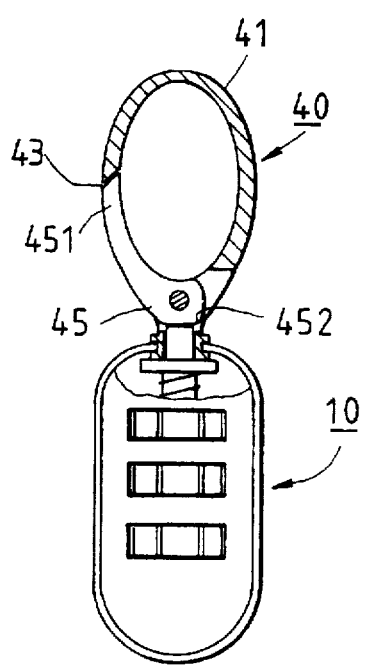
FIG. 7 shows a plan schematic view of a second preferred embodiment of the present invention.
Figure 8:
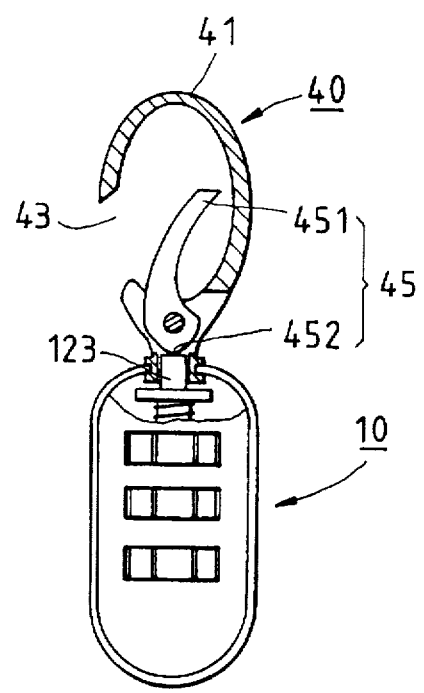
FIG. 8 shows a schematic view of the second preferred embodiment in action according to the present invention.

As shown in FIG. 7, the second preferred embodiment of the present invention is similar in construction to the first preferred embodiment described above, except that the former has a shackle 40 provided with a hooked portion 41 having a cut 43 which is longer than the cut 22 of the latter. Accordingly, the urging portion 451 of the retaining member 45 of the second preferred embodiment is corresponding in length to the cut 43 of the hooked portion 41 of the shackle 40. In operation, the urging portion 451 of the retaining member 45 is pressed with a finger so as to cause the urging portion 451 to swivel along the axis of the pivoting pin 46, as shown in FIG. 8. The engagement of the braking portion 452 of the retaining member 451 with the projection 123 of the body 10 causes the padlock to remain in the locking state. On the other hand, the disengagement of the braking portion 452 of the retaining member 451 with the projection 123 of the body causes the padlock to remain in the unlocking state. The body 10 and the shackle 40 of the second preferred embodiment of the present invention are similar in construction and function to those of the first preferred embodiment of the present invention.

Figure 9:
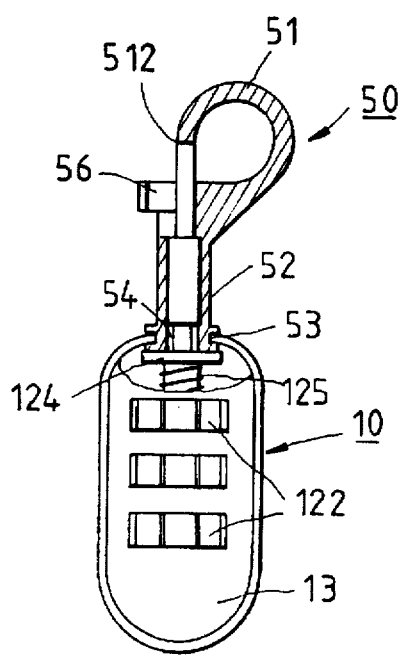
FIG. 9 shows a plan schematic view of a third preferred embodiment of the present invention.

As shown in FIG. 9, the body 10 of the third preferred embodiment of the present invention is similar in construction to that of the second preferred embodiment described above. The shackle 50 of the third preferred embodiment has a hooked portion 51, a neck 52, and a ring slot 53. The neck 52 has a through hole 54 engaging the projection 123 of the shaft rod 121 of the body 10. The retaining member 55 of a straight rodlike construction is received in the through hole 54 of the neck 52 such that the recess 512 of the hooked portion 51 is pressed against by the top end of the retaining member 55. The retaining member 55 is provided peripherally at the midsegment thereof with a triggering portion 56 for actuating the retaining member 55 to move up and down. Basically, the third preferred embodiment of the present invention is similar in principle to the second preferred embodiment of the present invention.

Figure 10:
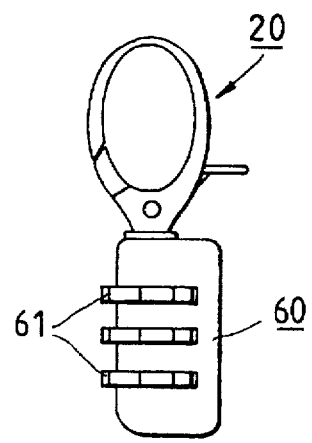
FIG. 10 shows a plan schematic view of a fourth preferred embodiment of the present invention.

It must be noted here that the shackle of the padlock of the present invention is applicable to any combination lock as long as the shaft rod of the combination lock body can be caused by the numbered wheels to move axially or stop. For example, the fourth preferred embodiment of the present invention comprises a combination lock body 60 provided with three numbered wheels 61, as shown in FIG. 10. The shackle 20 can be combined with the body 60 such that the shackle 20 can be swiveled freely.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A padlock comprising:

a body having a housing and a cover, said cover having through holes and an extension block with a recess, a numbered wheel set which is composed of a plurality of numbered wheels and a shaft rod, said wheel set engaged in said housing under said cover, said numbered wheel being mounted on said shaft rod and respectively extending out from said through holes on said cover, said numbered wheels being capable of causing said shaft rod to be displaceable, a shackle comprising a hooked portion and a neck, said hooked portion provided with a cut, said neck provided on a periphery of a bottom end thereof with a ring slot, a through hole in said neck extending in the direction of an axis of said neck, a top of said shaft rod slidably engaged in said through hole in said neck, said shackle further comprising a receiving slot located between said hooked portion and said neck for receiving therein a retaining member fastened pivotally therewith, an urging portion of said retaining member being biased against said cut of said hooked portion, said top end of said shaft rod of said numbered wheel set being biased against a braking portion of said retaining member, said neck of said shackle being engaged with said housing provided with a pivoting slot such that said ring slot of said neck is correspondingly and pivotally engaged with said pivoting slot of said housing and said recess of said cover, wherein said shackle can be rotated freely in relation to said body, and wherein said retaining member is provided with a trigger portion opposite in location to said urging portion.

2. A padlock comprising:

a body having a housing and a cover, said cover having through holes and an extension block with a recess, a numbered wheel set which is composed of a plurality of numbered wheels and a shaft rod, said wheel set engaged in said housing under said cover, said numbered wheels being mounted on said shaft rod and respectively extending out from said through holes on said cover, said numbered wheels being capable of causing said shaft rod to be displaced;

a shackle comprising a hooked portion and a neck, said hooked portion provided with a cut, said neck provided on a periphery of a bottom end thereof with a ring slot, a through hole in said neck extending in the direction of an axis of said neck for receiving therein a straight rodlike retaining member, a first end of said retaining member biased against said cut of said hooked portion, a second end of said retaining member being urged against said shaft rod, said periphery of a middled in a periphery of a midsegment thereof with a triggering portion, said neck of said shackle being engaged with said housing provided with a pivoting slot such that said ring slot of said neck is correspondingly and pivotally engaged with said pivoting slot of said housing and said recess of said cover wherein said shackle can be rotated freely in relation to said body.

* * * * *